United States Patent Office 3,396,551
Patented Aug. 13, 1968

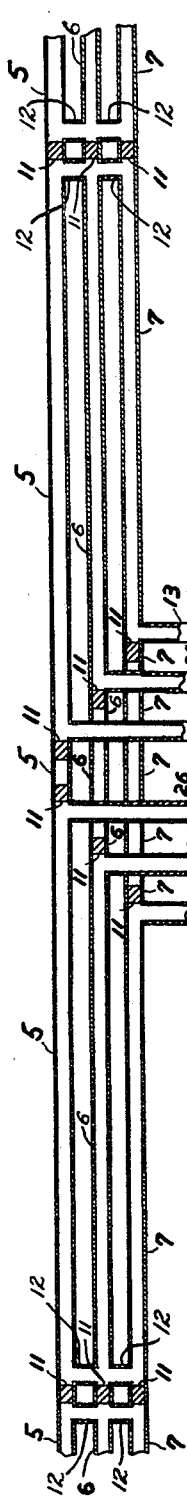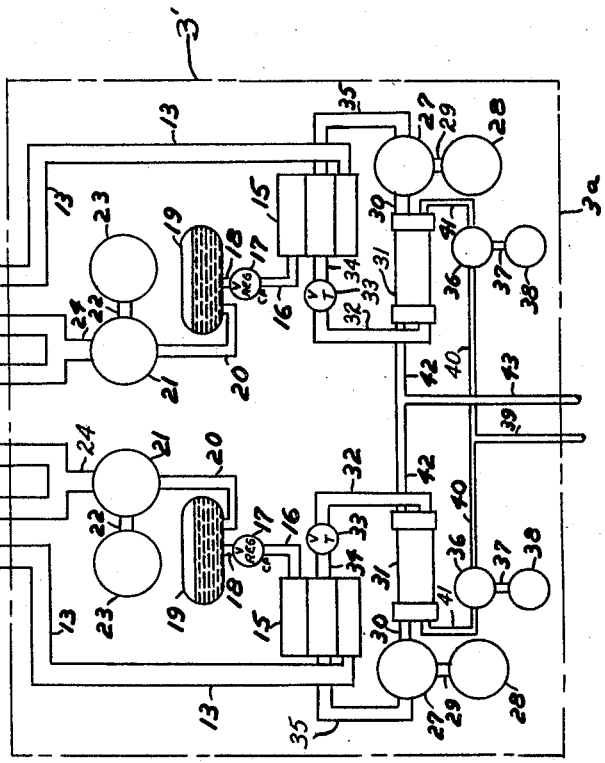

3,396,551
ELECTRICAL TRANSMISSION
COOLING SYSTEM
Moses Dimentberg, 347 Cathedral Ave.,
Winnipeg, Manitoba, Canada
Filed Aug. 19, 1966, Ser. No. 573,658
2 Claims. (Cl. 62—185)

ABSTRACT OF THE DISCLOSURE

An underground installation of a plurality of tubular conductors for electric current, the conductors containing a fluid refrigerant for cooling the same. At least one refrigerating station is provided and includes a pump for circulating the refrigerant through the conductors.

---

This invention relates to an apparatus for transmitting electrical power or energy wherein a refrigerant is used to maintain tubular electrical conductors at constant temperatures. The refrigerant is pumped through the tubular conductors, withdrawing the heat generated by the electrical current carried by the conductors, and transfers it to a cooling means located at refrigeration stations spaced along the length of the power transmission line.

In a preferred embodiment the invention relates to the transmission of relatively large quantities of electrical power over long distances and at high voltages wherein the electrical conductors are located underground and are covered with electrical insulation.

The present method of transmitting large quantities of electrical power is by overhead conductors which are supported by towers spaced at regular intervals along the line. Underground cables are employed in special instances but have been limited to relatively short distances and to relatively small quantities and voltages because of their high cost. The major disadvantage of the present type underground power cables is that heat generated in the cable due to electrical resistance, must be conducted through the insulation to the surrounding earth. The insulation is heated in this way and furthermore the types of insulation now used for underground cables (oil impregnated paper) are limited to approximately 200° F. in the temperatures that they may withstand.

In order to protect the insulation, the power loss of the line and hence its current density must be limited. This results in a much lower utilization of conductor material at present than is possible for overhead power lines.

Another important disadvantage of existing types of underground cables is that for alternating current transmission, the capacitance of the cables is high, thus resulting in high charging currents and high capacitative reactance. For these reasons underground cables have been unable to compete with overhead power lines for the transmission of large amount of power over long distances.

Underground cables do, however, have certain advantages when compared to overhead power lines. One of the advantages is that of greater reliability of service since they are not exposed to weather hazards such as high winds, freezing rain, lightning and the like. Another advantage is that of much reduced inductive reactance for AC transmission. Underground cables also eliminate corona losses and the problems of radio interference. Furthermore, underground cables supply much reduced hazards to the public.

Another important advantage is the elimination of the necessity for the reinforcement of the conductors to carry the longitudinal loads of the cables between adjacent towers.

It is thus readily apparent that if the advantages of underground cables can be retained and their disadvantages overcome, a method and system of power transmission superior to those now existing would result. Such a method is described herein inasmuch as I use a refrigerant to carry away the heat energy generated by the electrical resistance of the conductors. This means that the conductors and their electrical insulation may be maintained at safe operating temperatures independently of the current densities in the line. In this way full utilization of the conductor material is achieved.

Another important advantage is that by employing refrigerants to maintain the conductors at below ambient temperatures, reduced electrical resistances and hence lower power losses are achieved.

This is due to the well known fact that resistances of conducting materials decrease with a decrease in their temperatures.

Additional advantages in the case of AC transmission are considerably reduced capacitors and hence line charging current losses and capacitative reactance, due to the shape and arrangement of the tubular conductors and furthermore, a more effective use of conducting material because of the practical elimination of skin effect which is present in solid conductors.

Offsetting to some extent the advantages listed above, is the added cost of refrigerating equipment and the power required to operate this equipment. It should be noted, however, that the total of electrical resistance power loss and refrigeration system power requirements may readily be maintained at levels equal to or better than the power loses of the present types of transmission systems.

With the foregoing in view, and all those objects, purposes, or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 5 is a cross sectional view of a portion of the transmission line and including schematically one embodiment of the refrigeration system employed.

FIGURE 6 is an enlarged cross sectional view of a pipe conductor showing electrical and thermal insulation.

In the drawings like characters of reference indicate corresponding parts in the different figures.

Figure 1:
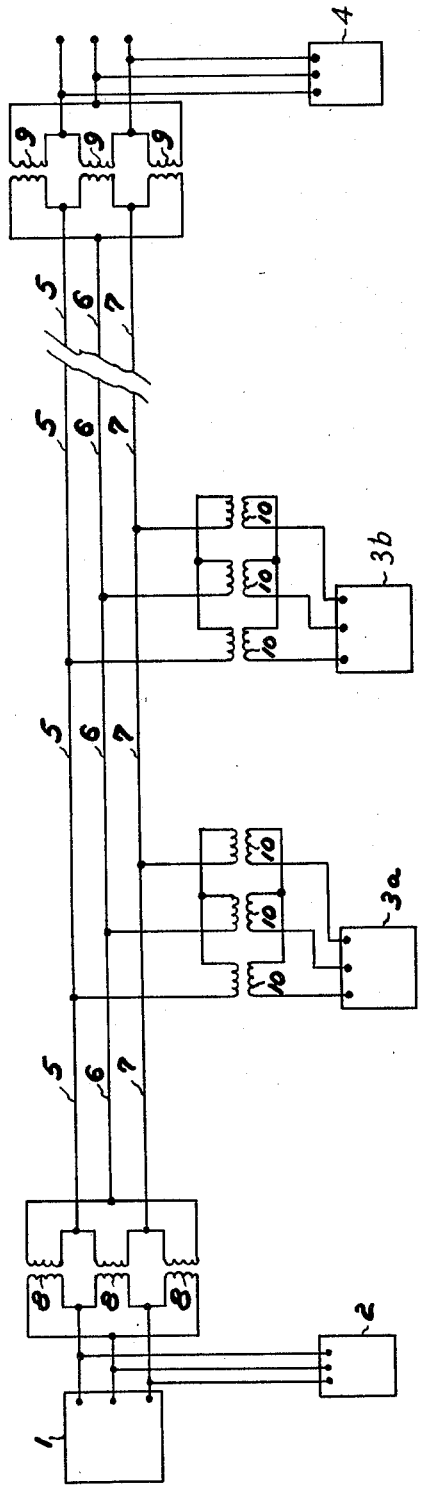
FIGURE 1 is an electrical schematic diagram of a three phase, three conductor, AC current power transmission line embodying my invention.

Proceeding now to describe my invention in detail, the power transmission line described in FIGURE 1 consists of generating station 1, where electrical power is generated, initial refrigeration station 2, intermediate refrigeration stations 3a, 3b, etc.; final refrigeration station 4, tubular electrical pipe conductors 5, 6 and 7, step-up transformers 8 at the generating end of the power line, step-down transformers 9 at the terminal of the line, and transformers 10 adjacent to refrigeration stations 3a, 3b, etc., said transformers being used to supply power to the stations from the transmission line. In this figure, all other lines are to be taken as conventional electrical cables connecting the various units on the line.

Electrical power is generated at station 1, and is conducted to step-up transformers 8 which are shown here arranged in a delta-delta connection, although other transformer connections may be used. At transformers 8, the voltage is increased to that desired for power transmission. The electrical current is carried over long distances between step-up transformers 8 and step-down transformers 9, by means of pipe conductors 5, 6 and 7. The conductors generally are buried underground, and may be located in conduits if desired (not illustrated). Each pipe conductor is covered with a layer of electrical insulation 5′ (FIG. 6). When the pipe conductors are to be operated at below ambient temperatures, they are covered with an additional layer of thermal insulation 6′ in order to prevent heat infiltration.

A refrigerant (or coolant) is pumped through the centers of the pipe conductors in a manner to be described below. The refrigerant used must be a non-conductor of electricity. The refrigerant absorbs the heat generated by the electrical resistance of the conductors, as well as heat infiltrating from the surrounding earth, and carries it to refrigeration stations 2, 3a, 3b, etc. and 4 where it is removed from the system. The refrigeration stations are spaced at essentially equal distances along the power line, their spacing being dependent upon many factors such as the amount of power being transmitted; the relative costs of refrigeration equipment and that of the pipe conductors; the location of electrical power markets along the transmission line, etc. A spacing of 20 miles for a high voltage power line may be expected to provide sufficient refrigerating effect.

Step-down transformers 9 at the terminal of the transmission line are provided to step down the voltage of the line to that required for safe handling by the distribution systems which are being supplied. Transformers 10 are also step-down transformers, and besides providing power for the intermediate refrigeration stations, they may also be used to provide electrical energy to neighbouring towns and industry which may be located in the vicinity of the refrigeration stations.

It is now intended to describe the refrigeration means for the power transmission line. With reference to FIGURE 5, a portion of the transmission line extending slightly more than midway between station 3a and 2, and between station 3a and 3b is shown. Pipe conductors 5, 6 and 7, together with portions of connecting pipes 13, 25 and 26 are shown in sectioned view. Thermal and electrical insulation have been omitted from the figure for clarity of presentation. Intermediate refrigeration station 3a is represented by a broken line 3′ within which is shown the essentials of one embodiment of the refrigeration equipment in schematic form. Station 3a contains two essentially identical refrigeration systems, one dealing with refrigerant from the upstream side of the line (in terms of the direction of electrical power transmission), and the other dealing with refrigerant from the downstream side.

Referring to the right hand system of station 3a, refrigerant is pumped by pump 21 through outlet pipe 24, and connecting pipes 25 and 26 into pipe conductors 5 and 6. Pump 21 is driven by electric motor 23 through drive shaft 22. Impermeable plugs 11 located within the pipe conductors upstream of connecting pipes 25 and 26, prevent refrigerant flow in the upstream power direction. The refrigerant is forced to flow downstream to a point midway between station 3a and 3b. Additional plugs 11 located within the pipe conductors at this point channel the flow of refrigerant from pipe conductors 5 and 6 through connecting pipes 12 and into pipe conductor 7. The refrigerant flows back upstream through pipe conductor 7 and into connecting pipe 13 which carries it back into refrigeration station 3a. A further plug 11 is situated in conduit 7 upstream of pipe 13.

During its passage through pipe conductors 5, 6 and 7, the refrigerant absorbs the heat produced by the electrical resistance of the conductors, as well as that produced by the fluid frictional resistance of the pipe conductors, and that infiltrating from the surrounding earth. The refrigerant is thus warmed as it passes through the pipe conductors, while the pipe conductors are maintained at the desired temperature.

Pipe conductor temperatures may thus be established ranging from ambient or slightly above ambient, to less than —300° F. The choice of operating temperatures will depend upon many factors such as the costs of thermal insulation, pipe conductors, refrigeration equipment, electrical power, and the coefficient of performance of the refrigeration cycle employed.

Pipes 12, 13, 25 and 26 are made of dielectric material and are of sufficient length to prevent leakage of the electric current carried in pipe conductors 5, 6 and 7 to the refrigeration station or from one pipe conductor to another.

Within station 3a, the refrigerant passes from pipe 13 into heat exchanger 15 where it is cooled by a secondary refrigeration system. Various standard types of refrigeration systems may be employed as the secondary refrigeration system. In FIGURE 5, a simple vapour refrigerant cycle is shown, consisting of compressor 27, condenser 31, throttle valve 33, and connecting pipes 30, 32, 34, and 35, compressor 27 is driven by electric motor 28 through drive shaft 29. Cooling water enters through inlet pipe 39, passes through pipe 40, and is forced by water pumps 36, through pipe 41, to condenser 31. From condenser 31 the heated water flows out of the refrigeration station through outlet pipes 42 and 43. Water pump 36 is driven by electric motor 38 through drive shaft 37.

The primary refrigerant, after being cooled in heat exchanger 15, passes through pipes 16 and 18 into accumulator 19. From the accumulator, the refrigerant is withdrawn through pipe 20 by means of pump 21 and is again pumped back into the pipe conductors to commence another cycle of flow.

In most cases it will be more efficient to maintain the primary refrigerant in the liquid state. To ensure that this occurs, back pressure valve 17 is placed in line 16. Valve 17 is set to provide refrigerant pressures on its upstream side of sufficient magnitude to prevent vaporization of the refrigerant in the pipe conductors.

Temperature sensitive control 14 is provided in inlet pipe 13 and controls the operation of electric motors 28 and 38 in order to maintain the transmission line refrigerant within the desired temperature limits. Temperature sensitive control 14 operates between two settings. When the temperature of the refrigerant passing control 14 reaches the upper setting, the control causes motors 28 and 38 to be turned on. This results in removal of heat from the system and its transfer to the cooling water outflow as explained earlier. When the temperature of the refrigerant passing control 14 drops to that of the lower setting, motors 28 and 38 are shut off. The period of operation of the refrigeration equipment is thus varied in a manner corresponding to the amount of heat which must be removed from the power transmission line, while at the same time, the line is maintained within narrow temperature limits.

It should be understood that the other intermediate refrigeration stations such as 3b have essentially the same equipment as 3a and which operate in the manner just described.

Initial refrigeration station 2 and final refrigeration station 4 each have essentially the same equipment as one of the refrigeration systems of station 3a. The operation of this equipment is also in the manner described above.

Figure 3:
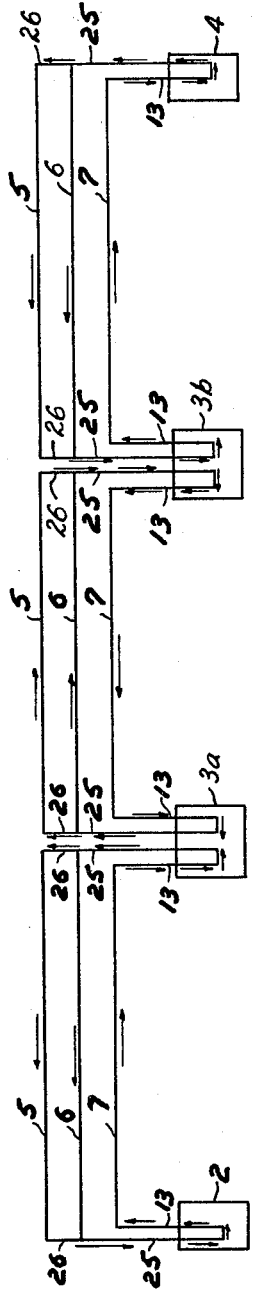
FIGURE 3 is a schematic diagram showing a still further alternative flow pattern of the primary refrigerant.
Figure 4:
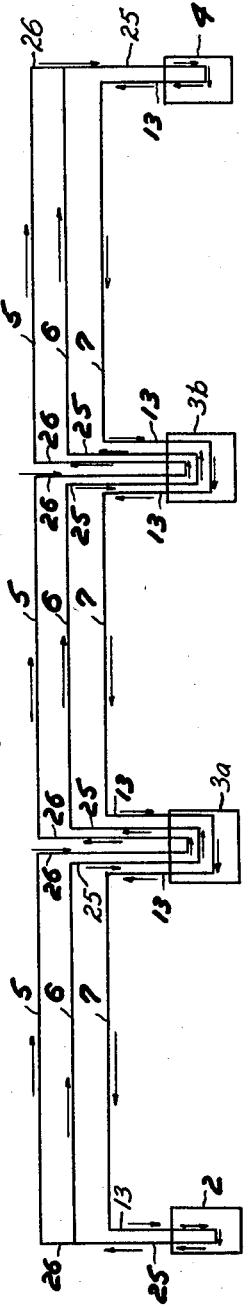
FIGURE 4 is a schematic diagram showing yet another alternative flow pattern of the primary refrigerant.

Alternative flow patterns of the primary refrigerant may be employed. FIGURES 3 and 4 are schematic diagrams of such flow patterns. In these figures, as in FIGURE 2, the arrows indicate the direction of refrigerant flow. While not shown in these figures, it is to be understood that plugs 11 are employed within pipe conductors 5, 6 and 7 to direct the flow of refrigerant in the desired flow patterns.

Under the flow pattern illustrated in FIGURE 3, closed loops are formed which consist of a refrigeration system of one refrigeration station, one of the refrigeration systems in the next adjacent station, and the lengths of pipe conductors 5, 6 and 7 between them.

Under the flow pattern show in FIGURE 4, refrigerant flows through pipe conductors 5 and 6 through each successive refrigeration station from one end of the transmission line to the other, and is returned through pipe conductor 7, again passing through each successive refrigeration station.

A further alternative flow pattern may be used wherein refrigerant is introduced in a continuous stream at one end of the power transmission line and flows in three parallel streams through pipe conductors 5, 6 and 7, passing through each successive refrigeration station to the other end of the line from which it is removed. This flow pattern may be used when it is desired to deliver refrigerant from one end of the line for use at the other end.

Figure 2:
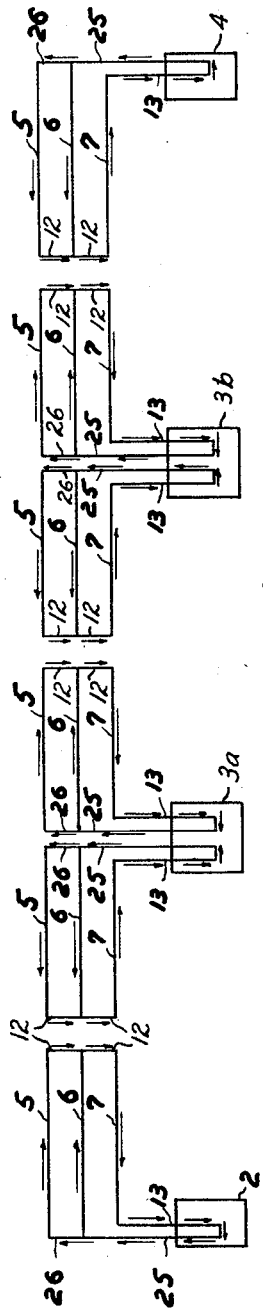
FIGURE 2 is a schematic diagram showing an alternative flow pattern of the primary refrigerant.

The refrigeration equipment employed for the alternative flow patterns is similar to that described for the flow pattern of FIGURE 2. Differences in arrangement are required, but these are within the scope of one skilled in the art and need not be described herein.

While the embodiment of my invention which has been described, is concerned with a 3 phase-3 conductor AC power line, it should be understood that my invention applies equally to other types of AC lines with any desired number of conductors, and to DC lines as well. In the case of DC lines, because of the difficulty of obtaining power from the lines along their length, other forms of prime movers will be used in most instances in place of electric motors 23, 28 and 38. Prime movers such as diesel or gas engines, steam turbines or gas turbines, may be used in place of the electric motors on DC lines and also on AC lines where alternative power sources are available and are economical.

To compensate for reactance on AC lines, it is expected that induction motors will be used at the refrigeration stations, while transformers 10 will be of the high reactance type. If required, shunt reactors may be placed in series with transformers 10 in the shunt lines to the transformers.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. An underground electric power transmission system, comprising in combination a plurality of spaced parallel tubular current conductors having external insulation thereon and containing a fluid refrigerant, a source of current at one end and a load at the other end of said conductors, at least one refrigerating station including a refrigerant circulating pump and having a refrigerant outlet line and a refrigerant inlet line connected respectively to two of said conductors at closely spaced points along their length, and a cross conduit of dielectric material connecting together said two conductors at a point remote from said inlet and outlet lines, whereby said pump may circulate the refrigerant through the refrigerating station and in relatively opposite directions through said two conductors, and a refrigerant temperature sensing means provided on said inlet line of said station, said station also including a motor driving said circulating pump, and said sensing means being operative to energize and deenergize said motor in response to temperature changes of refrigerant flowing through said inlet line.

2. The system as defined in claim 1 wherein said external insulation on said conductors includes thermal insulation against ingress of ambient heat, said refrigerant maintaining said conductors at substantially below ambient temperature.

References Cited
UNITED STATES PATENTS

| | | | |
|---|---|---|---|
| 2,286,594 | 6/1942 | Bennett | 174—15 |
| 2,306,527 | 12/1942 | Daniels | 174—15 |
| 2,686,215 | 8/1954 | Fondiller | 174—11 |
| 3,111,551 | 11/1963 | D'Ascoli | 174—15 |
| 3,162,716 | 12/1964 | Silver | 174—15 |

ROBERT A. O'LEARY, *Primary Examiner.*

W. E. WAYNER, *Assistant Examiner.*